W. J. HOLLAND.
DRILL.
APPLICATION FILED JUNE 29, 1917.
1,266,467.
Patented May 14, 1918.
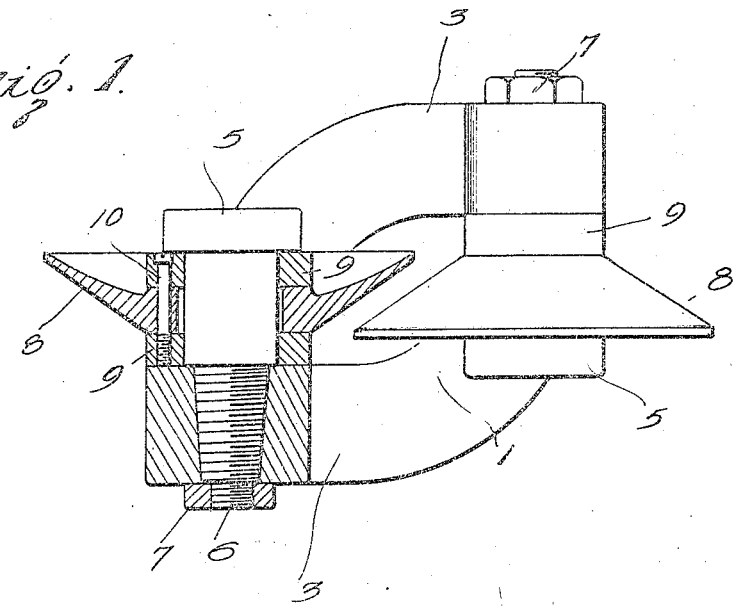
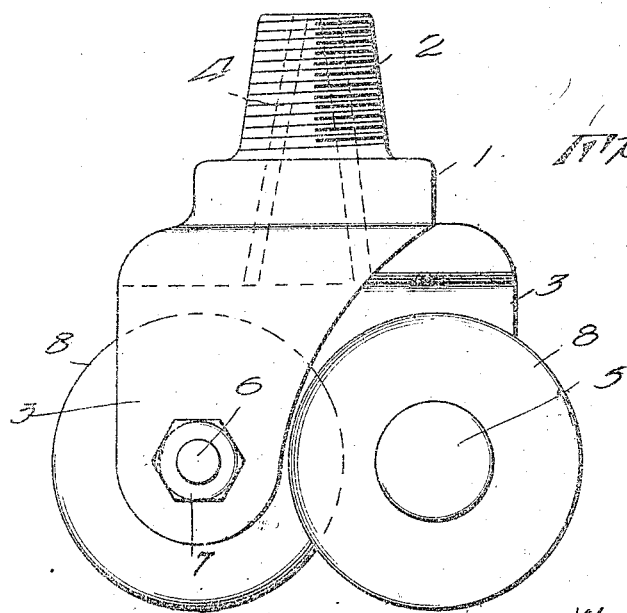
Walter J. Holland
Inventor
Attorney

UNITED STATES PATENT OFFICE.

WALTER J. HOLLAND, OF BERKELEY, CALIFORNIA.

DRILL.

1,266,467.  Specification of Letters Patent.  Patented May 14, 1918.

Application filed June 29, 1917. Serial No. 177,712.

*To all whom it may concern:*

Be it known that I, WALTER J. HOLLAND, a citizen of the United States, and resident of Berkeley, in the county of Alameda and State of California, have invented certain new and useful Improvements in Drills, of which the following is a specification.

This invention relates to drills, and it is the primary object of the invention to provide a rotatable disk drill, the disks of which are so positioned as to eliminate the forming of cores in the bore, thus, allowing water, which is used as a conveying medium to thoroughly remove the disintegrated portions of stone and preventing choking of the bore.

It is also an object of the invention to provide a novel mounting for the cutting disks, whereby, wear, caused by the rotation of disks, on the pins, and on the legs of the bit will be prevented.

Other and further improvements and novel details in the construction and arrangement of parts will be appreciated from the description to follow, which, for a clear understanding of the invention should be considered in connection with the accompanying drawings forming a part hereof and wherein the preferred embodiment of the invention is shown for the purposes of illustration.

In the drawings:

Figure 1 is a bottom plan of the improved drill with one of the cutting disks and its mounting shown in section; and Fig. 2 is a side elevation of the same.

Referring now more specifically to the drawings and in connection with which like reference numerals will designate corresponding parts throughout the several views, there is provided a head 1 having a screw threaded nipple 2 formed upon its upper portion and a plurality of spaced legs 3 upon its lower portion, the said legs being disposed parallel to each other and off-set whereby sufficient clearance will be allowed the cutting disk as carried thereby, which will be hereinafter more fully described. A plurality of diverging water ducts 4 are formed within the head 1 and its nipple 2 and are adapted to be connected with a suitable supply tube turned into engagement with the screw threaded portion of the said nipple, whereby water may be introduced into the borer for removing particles of stone, sand and other matter therefrom.

The lower extremities of the legs 3 are provided with tapering screw threaded openings and receive therein complementally formed portions of screws 5, the extremities of the said screws being reduced as at 6 in order that locking nuts 7 may be turned into engagement therewith. Obviously, portions of the screws 5 project beyond their respective legs 3 and provide efficient bearing means for the cutting disks.

Disks 8 concave on the cutting face and straight sloped on the back are loosely mounted upon the bearing portions of the screws 5 and have secured to their opposite sides bearing washers 9, which washers may be and preferably are formed of a metal softer than that from which the cutting disks 8 are formed. A plurality of openings are formed within the various bearing washers 9, certain of which are counter-sunk and receive there through connecting screws 10, the screws passing through similar openings as formed in the adjacent portions of the cutting disks and serving as means for securely uniting the same and their respective bearing washers. It is to be noted, that the bearing washers 9 are of a diameter less than the bearing openings as formed in the cutting disk 8 and as a consequence, will have the entire wear created by the rotation of the disk directed thereon. Upon loosening of the disks with relation to their respective bearing washers, the screw 10 may be tightened in order that the wear may be taken up while the locking nut 7 as engaged with the reduced portion 6 may be also tightened to move the screws 5 accordingly. The concave faced cutting disks 8 are arranged in longitudinal alinement and have portions of their sloped surfaces overlapping and arranged adjacent each other, thus, eliminating all space therebetween and preventing the forming of cores within the bore during the drilling operation.

Obviously, the adjacent sloping portions of the cutting disks 8 may have their relative positions varied to increase or decrease the space therebetween such as conditions or preference may dictate.

Manifestly, the construction shown is capable of considerable modification and such modification as is within the scope of my claims, I consider within the spirit of my invention.

I claim:—

1. A drill, including a head having spaced legs thereon, and disks having sloping backs carried by said legs, portions of the sloping surfaces of the disks overlapping and arranged adjacent each other.

2. A drill, including a head having spaced legs thereon, and disks having sloping backs arranged on said legs in longitudinal alinement, portions of the sloping surfaces of the disks overlapping and lying adjacent each other.

3. A drill, including a head having spaced legs thereon, adjustable bearing means carried by said legs, longitudinally alined disks having concaved cutting faces and sloped backs mounted loosely on said bearing means, portions of the surfaces of the disks overlapping and lying adjacent each other, and wear compensating washers secured to the opposite sides of the disks and engaged with the bearing means.

4. A drill, including a head having spaced legs thereon, and disks having concaved cutting faces and sloped backs carried by said legs, portions of the sloping backs of the disks overlapping and arranged adjacent each other.

In testimony whereof I affix my signature hereto.

WALTER J. HOLLAND.